Inventors:
Frederick M. Hugh
Norman E. Williams
John W. Gaines
Atty.

ns to the IPTO for logging purposes and to the TPTO for agricultural purposes. The compactness results from, among other reasons, the dual function of the shaft 14 as the TPTO and as a transfer shaft in the transmission, the dual function of the shaft 12 as the IPTO and as the input shaft, and the function of mutual support of each of the shafts 12 and 14 by the other. Neither of the PTO's interferes with the input end of the transmission because they extend in an opposite direction from the input shaft 12.

United States Patent Office 3,374,681
Patented Mar. 26, 1968

3,374,681
CONCENTRIC POWER TAKE-OFFS
Frederick M. Hugh, Mount Prospect, and Norman E. Williams, Park Ridge, Ill., assignors to International Harvester Company, Chicago, Ill., a corporation of Delaware
Filed July 22, 1966, Ser. No. 567,306
20 Claims. (Cl. 74—15.66)

This invention relates to independent concentric power take-off shafts for a vehicle, one shaft being driven directly by the prime mover, and the other shaft being driven through transmission gearing as a transfer shaft of said transmission.

Figure 1:
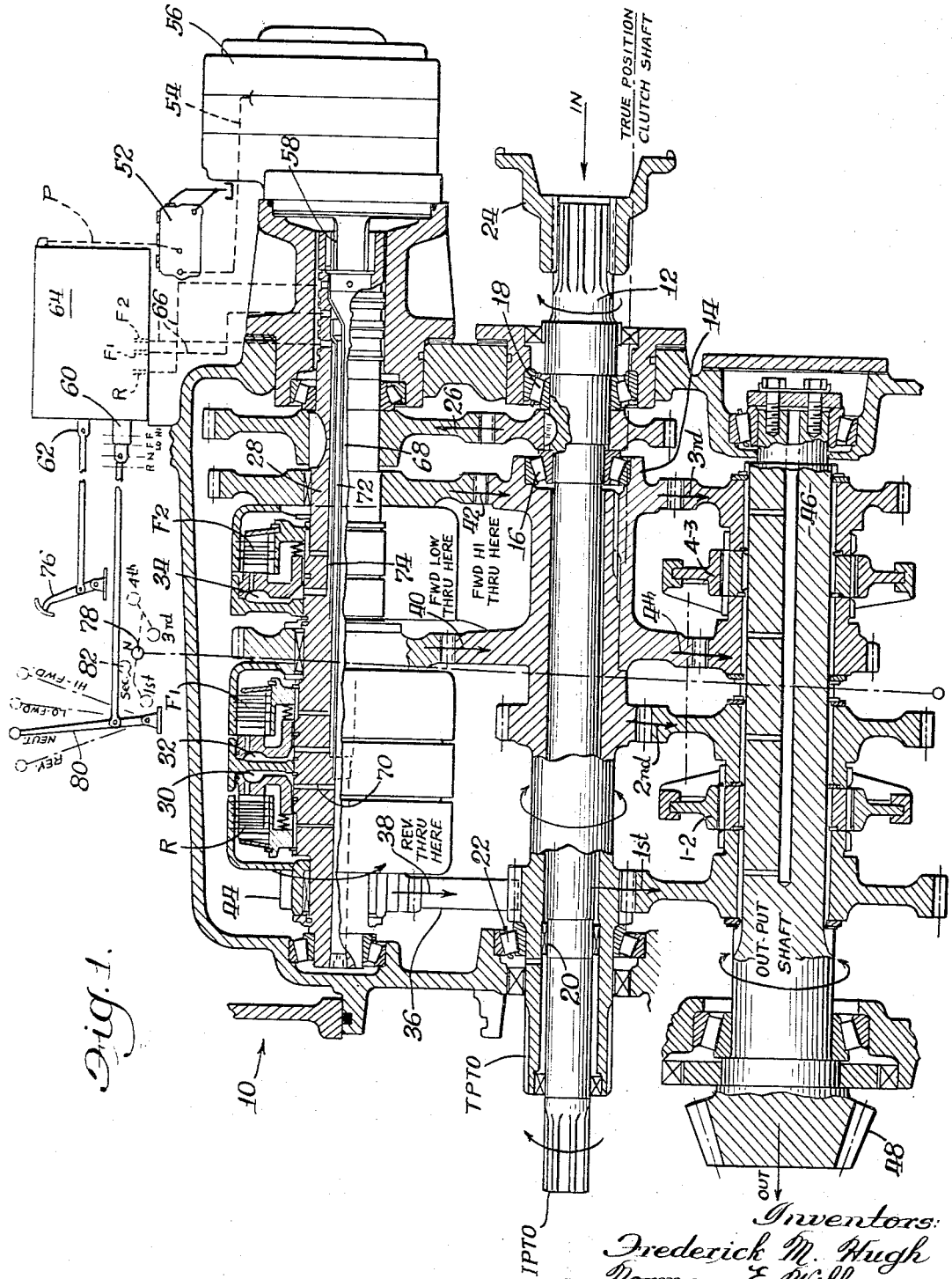
FIGURE 1 is a side elevational view, partly in section, taken along line 1—1 of FIGURE 2.

In a tractor transmission equipped with a pair of our concentrically arranged, power take-off shafts, and generally indicated at 10 in the accompanying drawings, an inner input shaft 12 forms an integral part of, and directly drives, a shaft designated by its function as an independent power take-off IPTO. Through transfer gearing in the transmission, the inner input shaft 12 also drives an outer shaft 14 designated a transmission power take-off TPTO. More specifically, these concentric shafts are arranged with the IPTO being run independently of the TPTO and at constant speed, i.e., engine speed, and being within and extending at one end beyond the corresponding end or terminal of the TPTO.

The arrangement is a highly convenient and compact one for PTO mechanism and therein lies one of the primary features of our invention.

The take-off connection is accomplished by first removing a cover plate, not shown, and is made in the same place irrespective of purpose, examples of the connections being to the IPTO for logging purposes and to the TPTO for agricultural purposes. The compactness results from, among other reasons, the dual function of the shaft 14 as the TPTO and as a transfer shaft in the transmission, the dual function of the shaft 12 as the IPTO and as the input shaft, and the function of mutual support of each of the shafts 12 and 14 by the other. Neither of the PTO's interferes with the input end of the transmission because they extend in an opposite direction from the input shaft 12.

At the input end, the inner shaft 12 supports a bearing 16 on which the transfer shaft 14 is journaled, and is supported on a bearing 18 in the case of the transmission 10. On the take-off end, the TPTO supports a bearing 20 in which the inner IPTO is journaled, and is supported in a bearing 22 in the case of the transmission 10.

Power shift

Power flow into the transmission 10 follows a power shift path from an engine connected universal coupling 24, through the input shaft 12, and a pinion and gear path in the direction indicated by an arrow 26, thence to a drilled clutch shaft 28 which has contra-rotation to the input shaft 12.

The clutch shaft 28 carries sets of clutch plates R, F1, and F2 which are controlled by a rear or directional cylinder 30, a first cylinder 32, and a speed cylinder 34. More specifically, the clutch plates R, F1, and F2 couple the clutch shaft 28 to the transfer shaft 14 selectively through a reverse idler gear 36 in a path indicated by an arrow 38 for rear or reverse drive, or in a gear path in the direction indicated by an arrow 40 for low speed forward drive, or in a gear path indicated by an arrow 42 for high speed forward drive. For this purpose, the output clutch plates of each set are coaxially fast with a gear such as gear 44 at the beginning of the associated gear path.

Mechanical shift

The transfer shaft 14 carries four integral gears. It is selectively coupled thereby to output in a first gear path in the direction indicated by an arrow 1ST, thence through an adjacent side of a mechanically operated shift clutch 1–2 to a drilled output shaft 46, or in a second path in the direction indicated by an arrow 2ND, thence through the adjacent side of the clutch 1–2 to the shaft 46, or in a third path in the direction indicated by an arrow 3RD, thence through the adjacent side of a mechanically operated shift clutch 4–3 to the shaft 46, or in a fourth path indicated by an arrow 4TH, thence through the adjacent side of the clutch 4–3 to the output shaft 46. The output shaft 46 is wheel-connected, and a reference numeral 48 is applied to a bevel output pinion which in general will be understood to symbolize the entire final drive train including said bevel pinion, the gearing, rear axle, final drive, the sprockets, and the track chains.

The transmission illustrated is primarily adapted for a crawler tractor of the type having left and right, track controlling steering valves, not shown.

Figure 2:
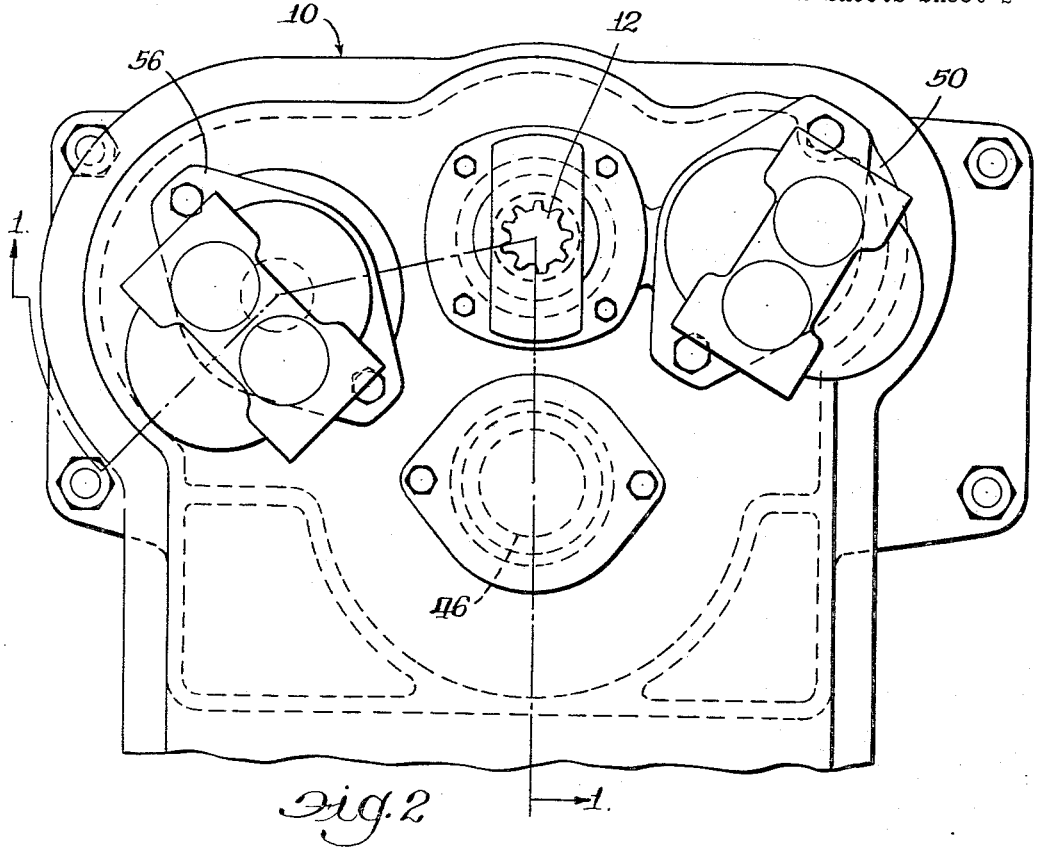
FIGURE 2 is an end view from the right side of FIGURE 1.

An equipment pump 50 (FIGURE 2), which is geared to the clutch shaft gear that is included in the pinion gear path 26, supplies oil under pressure to certain accessories, not shown, on the tractor such as dozer or bucket cylinders. The referred to steering valves are supplied with fluid by steering connections, among other connections, from a regulator valve assembly 52. The regulator valve assembly 52 has several fluid inlet connections thereto including, among others, a pump discharge connection 54 leading from a transmission pump 56 that is coupled at 58 to the clutch shaft 28.

Figure 3:
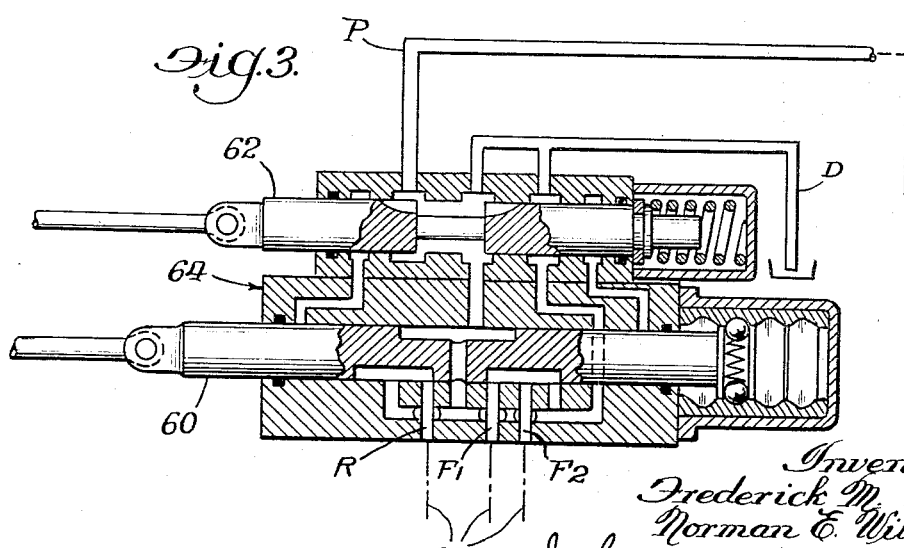
FIGURE 3 is a sectional view of the control valve assembly.

Control valve assembly (FIGURE 3)

A pair of lower and upper valve bodies slidably receiving a range selector valve or spool 60 and a clutch dump valve or spool 62 is bolted together to form a control valve assembly 64. The assembly 64 communicates through a pressure line P with a regulated pressure outlet on the regulator assembly 52, and communicates through a low pressure line D to drain, thus having the required source of high and low pressure necessary for hydraulic operation.

The selector valve 60, from the neutral position shown in solid lines, is slidable in one direction into an operative position connecting pressure to a supply passage forming an inlet-outlet port R, and is depressed in the opposite direction into operating positions selectively connecting pressure to a supply passage forming an inlet-outlet port F1 and to a supply passage forming an inlet-outlet port F2.

Fluid flow

The flow path between the inlet-outlet port R and the rear cylinder 30 remains the same irrespective of whether the selector valve 60 occupies the operative position for R, or the rest of its positions in each of which R is connected to drain. Such path, starting from the port R, is through the appropriate one of a set of separate supply connections 66, a longitudinal passage 68 in the clutch shaft 28, and a radial passage 70 leading into the directional cylinder 30. Similar connections including a longitudinal passage 72 establish communication between the port F1 and the first clutch cylinder 32. Similar connections including a longitudinal passage 74 establish communication between the port F2 and the speed clutch cylinder 34. Selectively, any one of the cylinders is operated by the selector valve 60 in an operative position and the remaining cylinders are all connected to drain.

The normal position of the dump valve 62 is shown in solid lines in FIGURE 3, in which the valve receives fluid from the line P serving as high pressure source and supplies such fluid to the selector valve 60 in the assembly 64. Manipulating the valve by foot, the driver depresses the dump valve 62 fully to an operative position connecting the selector valve 60 entirely to drain pressure of the line D, or to incremental intermediate positions of modulation between the extremes of high and low pressure.

Controls

In addition to the referred to steering valves, which are not shown and which are immaterial here, there are a valve connected, clutch dump pedal 76 and a mechanical clutch connected, gear shift lever handle 78.

Further, a range selector lever handle 80 is provided, having a link connection to the selector valve 60 and being employed by the driver to control the speed and direction of the TPTO when the tractor is either in motion or at rest. The IPTO is unidirectional in its rotation and driven at engine speed without increase or reduction whereas the TPTO when used for agricultural purposes such as to run a mower, as an example, can be power-shifted to the right speed and right direction for the purpose. The pedal 76 is not disturbed at that time, because depression thereof would cause the drive to the TPTO to be partly or completely disconnected. There would be no effect on the IPTO however.

The overall control and operation are shown and described in further detail in copending Ruhl, Polko, and Mayer patent application, Serial No. 567,618, filed July 25, 1966, which is assigned to the assignee hereof and the disclosure of which is incorporated in entirety herein by reference.

The term independent, as used herein in reference to the PTO shaft connected to the transmission input 12, applies irrespective of whether or not a clutch, not shown, intervenes between the engine and the input 12 to the transmission. If such clutch be provided, then the shaft is not only independent of the transmission but also independent of the engine so that it can be stopped or run at will without stopping the engine, thus falling literally within the standard STE definition of an IPTO shaft.

What is claimed is:

1. In a vehicle transmission having an input portion, and fluid-operated and mechanical shift clutches:
   clutch, IPTO, and output shafts, having their centerlines in a triangular arrangement as viewed in cross section;
   a transfer portion (14) in the transmission coupled to the input portion by means of the clutch shaft and a plurality of the fluid-operated clutches thereon, and coupled to the output shaft by means of a plurality of the mechanical shift clutches thereon; and
   a TPTO shaft, said transmission having the input portion drivingly connected in common to the clutch and IPTO shafts, and having the transfer portion drivingly connected to the TPTO shaft.

2. The invention of claim 1, characterized by:
   the transfer portion comprising a transfer shaft fixed to the TPTO shaft;
   means providing a forward drive path between the clutch and transfer shafts and including one fluid-operated clutch comprising a forward clutch (F1) carried by the clutch shaft, and a gear carried by the clutch shaft and meshing with means on the transfer shaft; and
   means providing a rear drive path between the clutch and transfer shafts and including one fluid-operated clutch comprising a reverse clutch (R) carried by the clutch shaft and a gear carried by the clutch shaft and meshing with means on the transfer shaft.

3. The invention of claim 2, further characterized by:
   means providing a 1ST drive path between the transfer and output shafts and including one side of a mechanical shift clutch and a 1ST path gear carried by the output shaft and meshing (at arrow 1ST) with means on the transfer shaft; and
   means providing a 2ND drive path between the transfer and output shafts and including one side of a mechanical shift clutch and a 2ND path gear carried by the output shaft and meshing (at arrow 2ND) with means on the transfer shaft.

4. The invention of claim 3, the input portion characterized by an input shaft (12) fixed to the IPTO shaft.

5. The invention of claim 4, characterized by:
   said input and IPTO shafts in common forming one, and said transfer and TPTO shafts in common forming the other, of a pair of concentric PTO shafts supported and journaled one within the other for independent relative rotation.

6. The invention of claim 5, characterized by:
   the axes of the non-concentric shafts being parallel to and mutually spaced apart from the others.

7. The invention of claim 5, characterized by:
   a source of high and low pressure communicating with the fluid-operated clutches and having valve means (60) in the communication for selectively connecting each clutch with high and low pressure; and
   handle means having selective mechanical connections to the plurality of mechanical shift clutches.

8. The invention of claim 3, the 1ST and 2ND drive paths characterized by low-speed; and
   means providing at least one high-speed drive path between the transfer and output shafts and including one side of a mechanical shift clutch (4–3) and a gear, both carried by the output shaft.

9. The invention of claim 2, the forward and rear drive paths characterized by low-speed; and
   means providing at least one high-speed drive path between the clutch and transfer shafts and including one fluid-operated clutch (F2) carried by the clutch shaft, and a gear carried by the clutch shaft and meshing with means on the transfer shaft.

10. A vehicle transmission comprising:
    input and output shafts having separate axes and arranged so as to project from the transmission in opposite directions;
    first and second concentric PTO shafts projecting in one of said directions on one of said axes; and
    separate means drivingly connecting the input shaft to each of the PTO shafts, said means (14) connected to at least the first PTO shaft comprising transmission gearing whereby that shaft serves as a transmission power take-off shaft having transmission selectable speed ratios.

11. The invention of claim 10, characterized by the input shaft projecting in the opposite direction from and being coaxial to the concentric shafts, and fixed to the second one.

12. The invention of claim 11, the transmission gearing characterized by:
    a clutch shaft and a plurality of fluid-operated clutches carried thereon;
    a plurality of mechanical shift clutches carried on the output shaft; and
    means comprising gear means and a transfer shaft, coupled between the clutch and output shafts by said clutches and driving the first concentric shaft.

13. The invention of claim 12, the concentric PTO shafts characterized by inner and outer shafts arranged with the inner shaft projecting at, at least, one end beyond the corresponding end of the outer shaft;
    said transfer shaft being fixed to the outer shaft and said input shaft being fixed to the inner shaft.

14. The invention of claim 13, characterized by:
    means providing forward and rear drive paths between the clutch and transfer shafts and each including a slow-speed drive, fluid-operated clutch carried by the clutch shaft, and further including a gear carried by the clutch shaft and meshing with means on the transfer shaft; and means providing a high-speed drive path between the clutch and transfer shafts and including a fluid-operated clutch carried by the clutch shaft, and a gear carried by the clutch shaft and meshing with means on the transfer shaft.

15. The invention of claim 14, further characterized by:

means providing slow-speed drive paths between the transfer and output shafts and each including one side of a mechanical shift clutch (1-2) carried by the output shaft and a 1ST path gear carried by the output shaft and meshing with gear means on the transfer shaft; and means providing at least one high-speed drive path between the transfer and output shafts and including one side of a mechanical shift clutch (4-3) carried by the output shaft, and a gear carried by the output shaft and meshing with gear means on the transfer shaft.

16. The invention of claim 15, further characterized by:

the axes of the respective output, clutch, and concentric PTO shafts being parallel to, and mutually spaced apart from, one another.

17. The invention of claim 16, further characterized by:

valve means having separate fluid connections to the fluid-operated clutches for selectively operating same; and handle means (78) having separate mechanical connections to the plurality of mechanical shift clutches for selectively shifting same.

18. The invention of claim 17, further characterized by:

a source of high and low pressure; and a range selector valve (60) having means of communication to said source including a dump valve, said range selector valve having means of separate connection (66) to the plurality of fluid-operated clutches for selectively connecting them with high and low pressure through the dump valve.

19. A vehicle transmission comprising:

input and output shafts having separate axes and arranged so as to project from the transmission in opposite directions;

a PTO shaft (14) coaxial with the input shaft and projecting in the same direction as the output shaft from said transmission;

transfer gear means on said PTO shaft; and means providing power paths between the input and PTO shafts, and formed by a clutch shaft connected to the input shaft and occupying a countershaft relationship to the input shaft, and a plurality of clutches carried by the clutch shaft, each having an individual gear carried by the clutch shaft, the gear means on the PTO shaft meshing with separate ones of said individual gears;

said clutches being power shift clutches of the fluid-controlled type rendering said PTO shaft a transmission power take-off shaft having selectible, power shift ranges of operation.

20. The invention of claim 19, characterized by the transmission power take-off shaft (14) being hollow, and further characterized by an independent power-take-off shaft therein fixed to the input shaft at one end and projecting at the opposite end concentrically beyond the corresponding end of the transmission power take-off shaft so as to provide two closely spaced apart take-offs.

References Cited

UNITED STATES PATENTS

| | | | |
|---|---|---|---|
| 2,323,384 | 7/1943 | Eberhard | 74—15.66 X |
| 2,899,034 | 8/1959 | Hubert | 74—15.66 X |

FOREIGN PATENTS 626,933  10/1961  Italy.

ROBERT M. WALKER, *Primary Examiner.*

LEONARD H. GERIN, *Examiner.*